United States Patent
Mola

(10) Patent No.: US 10,740,220 B2
(45) Date of Patent: Aug. 11, 2020

(54) CACHE-BASED TRACE REPLAY BREAKPOINTS USING RESERVED TAG FIELD BITS

(71) Applicant: MICROSOFT TECHNOLOGY LICENSING, LLC, Redmond, WA (US)

(72) Inventor: Jordi Mola, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 112 days.

(21) Appl. No.: 16/020,636

(22) Filed: Jun. 27, 2018

(65) Prior Publication Data

US 2020/0004662 A1  Jan. 2, 2020

(51) Int. Cl.
*G06F 9/32* (2018.01)
*G06F 11/36* (2006.01)
*G06F 12/10* (2016.01)
*G06F 11/30* (2006.01)
(Continued)

(52) U.S. Cl.
CPC ...... *G06F 11/3648* (2013.01); *G06F 11/3037* (2013.01); *G06F 12/0817* (2013.01); *G06F 12/1027* (2013.01); *G06F 9/327* (2013.01); *G06F 9/328* (2013.01); *G06F 11/362* (2013.01); *G06F 2212/684* (2013.01)

(58) Field of Classification Search
CPC ............. G06F 11/3648; G06F 11/3037; G06F 11/3656; G06F 11/362; G06F 11/3644; G06F 11/3664; G06F 11/3636; G06F 12/1027; G06F 12/0817; G06F 2212/652; G06F 2212/68; G06F 2212/681; G06F 2212/682; G06F 2212/683; G06F 2212/684; G06F 2009/45591; G06F 9/327; G06F 9/328
USPC ..... 712/227, 245; 714/34, 35; 711/205–208; 717/129
See application file for complete search history.

(56) References Cited

U.S. PATENT DOCUMENTS

| | | | |
|---|---|---|---|
| 5,535,318 A | | 7/1996 | Motoyama et al. |
| 5,664,159 A | * | 9/1997 | Richter ............... G06F 11/3648 703/23 |
| 6,106,572 A | | 8/2000 | Halpern |

(Continued)

OTHER PUBLICATIONS

"Notice of Allowance Issued in U.S. Appl. No. 15/405,849", dated Dec. 10, 2018, 6 Pages.
(Continued)

*Primary Examiner* — Daniel H Pan

(57) ABSTRACT

Performing breakpoint detection via a cache includes detecting an occurrence of a memory access and identifying whether any cache line of the cache matches an address associated with the memory access. When a cache line does match the address associated with the memory access no breakpoint was encountered. When no cache line matches the address associated with the memory access embodiments identify whether any cache line matches the address associated with the memory access when one or more flag bits are ignored. When a cache line does match the address associated with the memory access when the one or more flag bits are ignored, embodiment perform a check for whether a breakpoint was encountered. Otherwise, embodiments process a cache miss.

19 Claims, 8 Drawing Sheets

(51) Int. Cl.
*G06F 12/0817* (2016.01)
*G06F 12/1027* (2016.01)

(56) References Cited

U.S. PATENT DOCUMENTS

| | | | |
|---|---|---|---|
| 6,134,710 | A | 10/2000 | Levine et al. |
| 6,182,208 | B1 | 1/2001 | Peri et al. |
| 6,237,135 | B1 | 5/2001 | Timbol |
| 6,240,545 | B1 | 5/2001 | Carmichael et al. |
| 6,795,962 | B1 | 9/2004 | Hanson |
| 7,000,225 | B2 | 2/2006 | Sangavarapu et al. |
| 7,249,225 | B1 | 7/2007 | Seidl et al. |
| 7,269,825 | B1 | 9/2007 | Adcock |
| 7,296,259 | B2 | 11/2007 | Betker et al. |
| 7,694,278 | B2 | 4/2010 | Pasumansky et al. |
| 7,840,849 | B2 | 11/2010 | O'Callahan |
| 8,095,861 | B2 | 1/2012 | Bybell |
| 8,423,965 | B2 | 4/2013 | Goel et al. |
| 8,539,209 | B2 | 9/2013 | Pogor et al. |
| 8,578,340 | B1 | 11/2013 | Daudel et al. |
| 8,656,359 | B2 | 2/2014 | Savov |
| 8,832,659 | B2 | 9/2014 | Ceze et al. |
| 9,021,444 | B2 | 4/2015 | Garrett et al. |
| 9,032,374 | B2 | 5/2015 | Munson et al. |
| 9,436,603 | B1 | 9/2016 | Pohlack |
| 10,268,558 | B2 | 4/2019 | Mola |
| 2002/0087807 | A1* | 7/2002 | Gharachorloo ..... G06F 12/0826 711/141 |
| 2003/0061599 | A1 | 3/2003 | Bates et al. |
| 2003/0106045 | A1 | 6/2003 | Arnold et al. |
| 2004/0049712 | A1* | 3/2004 | Betker ................ G06F 11/3648 714/35 |
| 2004/0172623 | A1 | 9/2004 | Eckels et al. |
| 2004/0225920 | A1 | 11/2004 | Bates et al. |
| 2006/0101405 | A1 | 5/2006 | Buschardt et al. |
| 2007/0022322 | A1* | 1/2007 | Chen ................... G06F 11/3644 714/38.13 |
| 2007/0168736 | A1 | 7/2007 | Ottavi et al. |
| 2008/0196013 | A1 | 8/2008 | Sim |
| 2009/0150870 | A1 | 6/2009 | Bates |
| 2011/0047314 | A1* | 2/2011 | Pogor ................ G06F 11/3648 711/3 |
| 2011/0072309 | A1 | 3/2011 | Sakai et al. |
| 2011/0126176 | A1 | 5/2011 | Kandasamy et al. |
| 2011/0154111 | A1 | 6/2011 | Beilmann et al. |
| 2012/0131309 | A1 | 5/2012 | Johnson et al. |
| 2012/0291017 | A1 | 11/2012 | Fuhrer et al. |
| 2014/0289711 | A1* | 9/2014 | Usui .................... G06F 11/362 717/129 |
| 2015/0033211 | A1 | 1/2015 | Bates et al. |
| 2015/0089159 | A1 | 3/2015 | Busaba et al. |
| 2015/0121127 | A1* | 4/2015 | Jain .................... G06F 11/1402 714/6.11 |
| 2015/0378870 | A1 | 12/2015 | Marron et al. |
| 2016/0292061 | A1 | 10/2016 | Marron et al. |
| 2017/0249230 | A1 | 8/2017 | Tsirkin et al. |
| 2017/0357446 | A1 | 12/2017 | Moyer |
| 2018/0113806 | A1 | 4/2018 | Mola |
| 2018/0203780 | A1 | 7/2018 | Mola |
| 2018/0267882 | A1 | 9/2018 | Mola et al. |
| 2019/0196928 | A1 | 6/2019 | Mola |

OTHER PUBLICATIONS

"Non Final Office Action Issued in U.S. Appl. No. 16/292,646", dated Aug. 7, 2019, 29 Pages.
"Notice of Allowance Issued in U.S. Appl. No. 16/292,646", dated Oct. 30, 2019, 6 Pages.
"International Search Report and Written Opinion Issued in PCT Application No. PCT/US19/037571", dated Oct. 4, 2019, 11 Pages.
"Non Final Office Action Issued in U.S. Appl. No. 15/405,849", dated Aug. 9, 2018, 23 Pages.
"Chronon Time Travelling Debugger", Retrieved From http://chrononsystems.com/products/chronon-time-travelling-debugger, Retrieved on: Nov. 24, 2016, 5 Pages.
Barr, et al.,"Tardis: affordable time-travel debugging in managed runtimes", In Proceedings of the ACM International Conference on Object Oriented Programming Systems Languages & Applications., Oct. 20, 2014, 16 Pages.
Bhansali, et al., "Framework for instruction-level tracing and analysis of program executions", In Proceedings of the 2nd international conference on Virtual execution environments., Jun. 14, 2006, pp. 154-163.
Haller, et al., "MemPick: High-Level Data Structure Detection in C/C++ Binaries", In Proceedings of 20th Working Conference on Reverse Engineering, Oct. 14, 2013, pp. 32-41.
Hearon, James, "A Pure Data Break Point Function patch", In Csound Journal, Issue 5, May 20, 2007, 3 Pages.
Marron, et al., "Time-Travel Debugging for JavaScript/HTML Applications", Retrieved from https://channel9.msdn.com/blogs/Marron/Time-Travel-Debugging-for-JavaScriptHTML, May 13, 2015, 12 Pages.
Pandy, Laslo, "Elm's Time Traveling Debugger", Retrieved from http://web.archive.org/web/20140416213617/http:/debug.elm-lang.org/, Apr. 16, 2014, 6 Pages.
"International Search Report and Written Opinion Issued in PCT Application No. PCT/US17/068842", dated Jul. 3, 2018, 25 Pages.
"International Search Report and Written Opinion Issued in PCT Application No. PCT/US18/022084", dated Jun. 4, 2018, 15 Pages.
Phang, et al., "Expositor: scriptable time-travel debugging with I first-class traces", In Proceedings of the 2013 International Conference on Software Engineering, May 18, 2013, pp. 352-361.

* cited by examiner

_300a_

| Hexadecimal | Binary | Decimal |
|---|---|---|
| 000 | 0000 0000 0000 | 0 |
| 040 | 0000 0100 0000 | 64 |
| 080 | 0000 1000 0000 | 128 |
| 0C0 | 0000 1100 0000 | 192 |
| 100 | 0001 0000 0000 | 256 |
| 140 | 0001 0100 0000 | 320 |
| 180 | 0001 1000 0000 | 384 |
| 1C0 | 0001 1100 0000 | 448 |
| 200 | 0010 0000 0000 | 512 |

| Hexadecimal | Binary | Decimal |
|---|---|---|
| 000 | 0000 0000 0000 | 0 |
| 020 | 0000 0010 0000 | 32 |
| 040 | 0000 0100 0000 | 64 |
| 060 | 0000 0110 0000 | 96 |
| 080 | 0000 1000 0000 | 128 |
| 0A0 | 0000 1010 0000 | 160 |
| 0C0 | 0000 1100 0000 | 192 |
| 0E0 | 0000 1110 0000 | 224 |
| 100 | 0001 0000 0000 | 256 |
| 120 | 0001 0010 0000 | 288 |
| 140 | 0001 0100 0000 | 320 |
| 160 | 0001 0110 0000 | 352 |
| 180 | 0001 1000 0000 | 384 |
| 1A0 | 0001 1010 0000 | 416 |
| 1C0 | 0001 1100 0000 | 448 |
| 1E0 | 0001 1110 0000 | 480 |
| 200 | 0010 0000 0000 | 512 |

*FIG. 3B*

CACHE-BASED TRACE REPLAY BREAKPOINTS USING RESERVED TAG FIELD BITS

BACKGROUND

When writing code during the development of software applications, developers commonly spend a significant amount of time "debugging" the code to find runtime errors in the code. In doing so, developers may take several approaches to reproduce and localize a source code bug, such as observing behavior of a program based on different inputs, inserting debugging code (e.g., to print variable values, to track branches of execution, etc.), temporarily removing code portions, etc. Tracking down runtime errors to pinpoint code bugs can occupy a significant portion of application development time.

Many types of debugging applications ("debuggers") have been developed in order to assist developers with the code debugging process. These tools offer developers the ability to trace, visualize, and alter the execution of computer code. For example, debuggers may visualize the execution of code instructions, may present variable values at various times during code execution, may enable developers to alter code execution paths, and/or may enable developers to set "breakpoints" and/or "watchpoints" on code elements of interest (which, when reached during execution, causes execution of the code to be suspended), among other things. In general, a "breakpoint" refers to a memory location storing a specified portion of executable code (e.g., a line of code, a variable definition, a function definition, etc.), while a "watchpoint" refers to a memory location storing data (e.g., a memory location storing the value a variable, constant, data structure, etc.). For simplicity herein, use of the term "breakpoint" refers to both breakpoints and watchpoints.

An emerging form of debugging applications enable "time travel," "reverse," or "historic" debugging, in which execution of a program is recorded/traced by tracing software and/or hardware into one or more trace files, which can be then be used to replay execution of the program later for forward and backward analysis. For example, "time travel" debuggers can enable a developer to set forward breakpoints (like conventional debuggers) as well as reverse breakpoints.

One challenge in implementing "time travel" debuggers involves how to detect when a memory address of interest (e.g., corresponding to a breakpoint) has been encountered during replay of a trace file in a flexible and performant manner. One mechanism that has been explored for tracking memory addressees of interest during replay is to use processor-implemented hardware breakpoints. While performant, use of hardware breakpoints has the disadvantage of severely limiting the number of memory addresses that can be concurrently watched for. For example, the INTEL x86 architecture provides only four debug registers (i.e., DR0 to DR3) for storing memory addresses to watch for. Use of hardware breakpoints also has the disadvantage of inherently binding a debugger implementation to specifically-supported hardware (e.g., by relying on the x86 debug registers).

Another mechanism that has been explored is to use software breakpoints, in which each traced operation that accesses memory (e.g., a read or a write to memory storing data, or a read/fetch for execution from memory storing program code) is instrumented with additional code instructions that check whether or not the access is to a memory address of interest. However, instrumentation has the severe disadvantage of causing a check for the occurrence of a breakpoint to be performed for every memory access, regardless of whether or not that memory access would actually correspond to a breakpoint. In many environments, execution of the instrumented code instructions results in the use of tens to hundreds of additional processor cycles for each memory access, which has a significant detrimental effect on replay performance that is perceivable by a human user.

Previous solutions by the inventor to address the foregoing challenges through use of caches (e.g., a cache of a hardware or emulated processor, or some other cache memory structure) as part of breakpoint detection. These solutions greatly limit the number of processor cycles needed to perform a breakpoint check as compared to instrumentation, and are described in U.S. patent application Ser. No. 15/405,849, filed Jan. 13, 2017, and titled "EFFICIENT BREAKPOINT DETECTIONS VIA CACHES," the entire contents of which are incorporated by reference in their entirety.

These solutions use a cache to limit breakpoint checks to only memory accesses that cause cache misses to occur, rather than performing a breakpoint check on every memory access. These solutions can offer great performance improvements over non-cache-based breakpoint detection solutions, while providing a virtually limitless number of breakpoints. They involve evicting a cache line if it overlaps with a memory address that corresponds to a breakpoint, and then "single stepping" the processor on each cache miss in order to determine if a breakpoint was encountered. While being an advancement over instrumentation for breakpoint detection, these solutions severely impact execution performance when cache misses occur (even if no breakpoint was hit in connection with the cache miss), and also cause cache misses to occur more frequently than they might absent use of the cache for breakpoint detection (i.e., because they proactively evict cache lines that overlap with a watched-for memory address).

BRIEF SUMMARY

At least some embodiments described herein advance cache-based breakpoint detection in a manner that avoids evicting cache lines overlapping with memory addresses that are being watched for, while preserving the advantages of prior cache-based breakpoint detection techniques. In particular, rather than evicting a cache line that overlaps with a watched-for memory address, these embodiments utilize one or more "reserved" (or otherwise unused) bits in the cache line's tag field (or similar mechanism) in order to signal that the cache line overlaps with a watched-for memory address. Doing so not only reduces the number of cache misses that occur, but also enables efficient breakpoint checks to be performed when there is a subsequent memory access involving the cache line (i.e., as opposed to only during a cache miss). In particular, rather than needing to re-import the cache line on a subsequent memory access due to a cache miss, an efficient breakpoint check can be performed when there is a hit on any cache line that has a reserved bit set in the cache line's tag field. Thus, the embodiments herein avoid cache line evictions for the purposes of breakpoint detection and add a new efficient breakpoint detection mechanism for existing cache lines—both of which can greatly reduce the overhead caused by a debugger for detecting breakpoints during a trace replay.

In some embodiments, configuring a cache for breakpoint detection includes identifying a memory address that is to be monitored, and then determining whether a cache line overlapping with the memory address already exists in a cache. If so, the embodiment includes setting a flag in a tag field of the cache line. Otherwise, the embodiment might process a cache miss and set a flag in a tag field of a newly-imported cache line, or might simply end.

In other embodiments, performing breakpoint detection via a cache includes detecting an occurrence of a memory access, and then identifying whether any cache line of the cache matches an address associated with the memory access. When a cache line does match the address associated with the memory access, the embodiment includes determining that no breakpoint was encountered. When no cache line matches the address associated with the memory access, the embodiment includes identifying whether any cache line matches the address associated with the memory access when one or more flag bits are ignored. When a cache line does match the address associated with the memory access when the one or more flag bits are ignored, the embodiment includes performing a check for whether a breakpoint was encountered. Otherwise, the embodiment includes processing a cache miss, while potentially performing a breakpoint check and/or setting a flag in a tag field of a newly-imported cache line.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3A illustrates an example of memory addresses using 64-byte memory alignment;

FIG. 3B illustrates an example of memory addresses using 32-byte memory alignment;

DETAILED DESCRIPTION

At least some embodiments described herein advance cache-based breakpoint detection in a manner that avoids evicting cache lines overlapping with memory addresses that are being watched for, while preserving the advantages of prior cache-based breakpoint detection techniques. In particular, rather than evicting a cache line that overlaps with a watched-for memory address, these embodiments utilize one or more "reserved" (or otherwise unused) bits in the cache line's tag field (or similar mechanism) in order to signal that the cache line overlaps with a watched-for memory address. Doing so not only reduces the number of cache misses that occur, but also enables efficient breakpoint checks to be performed when there is a subsequent memory access involving the cache line (i.e., as opposed to only during a cache miss). In particular, rather than needing to re-import the cache line on a subsequent memory access due to a cache miss, an efficient breakpoint check can be performed when there is a hit on any cache line that has a reserved bit set in the cache line's tag field. Thus, the embodiments herein avoid cache line evictions for the purposes of breakpoint detection and add a new efficient breakpoint detection mechanism for existing cache lines—both of which can greatly reduce the overhead caused by a debugger for detecting breakpoints during a trace replay.

Figure 1:
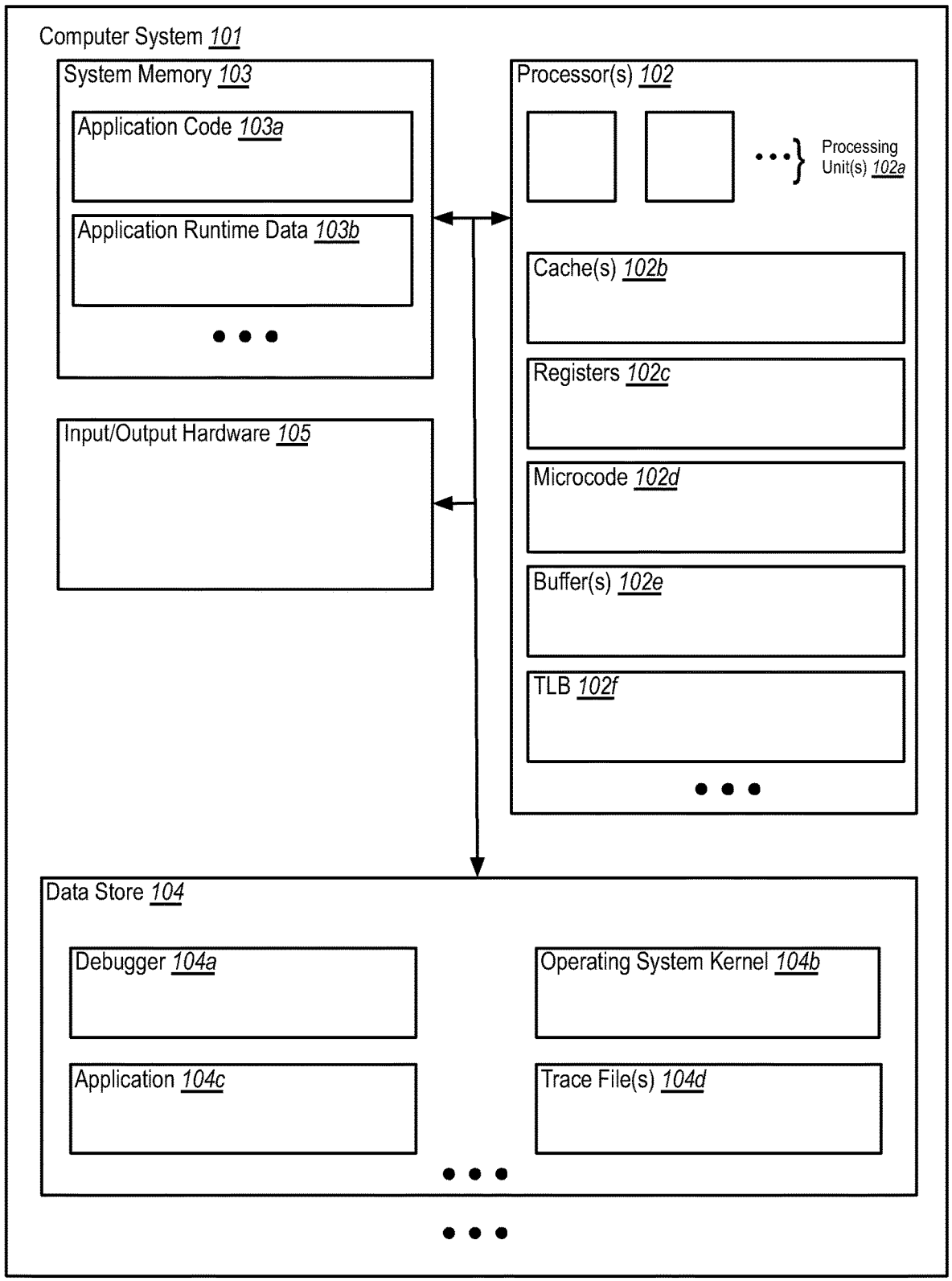
FIG. 1 illustrates an example computing environment that facilitates cache-based trace replay breakpoints using reserved tag field bits.

Initially, FIG. 1 illustrates an example computing environment 100 that facilitates cache-based trace replay breakpoints using reserved tag field bits. As depicted, embodiments may comprise or utilize a special-purpose or general-purpose computer system 101 that includes computer hardware, such as, for example, one or more processors 102, system memory 103, one or more data stores 104, and/or input/output hardware 105. In some embodiment, computer system 101, and the components therein, could comprise a virtualized environment.

Embodiments within the scope of the present invention include physical and other computer-readable media for carrying or storing computer-executable instructions and/or data structures. Such computer-readable media can be any available media that can be accessed by the computer system 101. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage media are physical and tangible hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the computer system 101 to implement the disclosed functionality of the invention. Thus, for example, computer storage devices may include the depicted system memory 103, the depicted data store 104 which can store computer-executable instructions and/or data structures, or other storage such as on-processor storage, as discussed later.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media. For example, the input/output hardware 105 may comprise networking hardware (e.g., a hard-wired or wireless network interface module) that connects a network and/or data link that can be used to carry program code in the form of computer-executable instructions or data structures.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within networking hardware, and then eventually transferred to the system memory 103 and/or to less volatile computer storage devices (e.g., data store 104) at the computer system 101. Thus, it should be understood that computer storage devices can be included in computer system components that also (or even primarily) utilize transmission media.

Computer-executable instructions comprise, for example, instructions and data which, when executed at the processor(s) 102, cause the computer system 101 to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

As illustrated, the data store 104 can store computer-executable instructions and/or data structures representing application code such as, for example, a debugger 104a, an operating system kernel 104b, and an application 104c. The data store 104 can also store other types of data, such as one or more trace file(s) 104d. When application code is executing (e.g., using the processor(s) 102), the system memory 103 can store corresponding runtime data, such as runtime data structures, computer-executable instructions, etc. Thus, FIG. 1 illustrates the system memory 103 as including application code 103a and application runtime data 103b. While the trace file(s) 104d are depicted as being stored in the data store 104, they may also be recorded exclusively or temporarily in the system memory 103, or at some other storage device (e.g., buffer(s) 102e within processor(s) 102).

Debugger 104a can trace execution of executing at the processor(s) 102 and/or replay a trace recorded in trace file(s) 104d. For example, debugger 104a might trace execution of application 104c and store resulting trace data (e.g., register values, memory values, etc.) in the trace file(s) 104d. Additionally, or alternatively, the debugger 104a might replay traced execution of application 104c from the trace file(s) 104d by executing the code of application 104c at the processor(s) 102, while supplying that code with traced data (e.g., register values, memory values, etc.) from the trace file(s) 104d at appropriate times. While, for brevity, this recording and replay functionality is depicted as a single box (i.e., debugger 104a), it will be appreciated that this functionality could be separated into different applications or components.

For example, a trace recorder could be part of debugger 104a, or it could be a standalone application or integrated into another software component, such as the operating system kernel 104b, a hypervisor, etc. A trace recorder may also exist at an entirely different computer system. Thus, the trace file(s) 104d could originate from another computer system and be transferred (e.g., using the input/output hardware 105) to the computer system 101 for replay by debugger 104. In general, a trace recorder records execution of one or more code portions of application 104c at the processor(s) 102 or at some other computer system, while storing trace data (e.g., memory values read by code instructions, register values supplied code instructions, etc.) into the trace files(s) 104d. Then, a trace replay component can re-execute the code portion(s) at the processor(s) 102, while supplying that code with the trace data from the trace files(s) 104d so that the code is executed in substantially the same manner that it was executed at trace time.

FIG. 1 also includes a simplified representation of the internal hardware components of the processor(s) 102, often referred to as a central processing unit (CPU). As illustrated, each processor 102 includes a plurality of processing units 102a. Each processing unit may be physical (i.e., a physical processor core) and/or logical (i.e., a logical core presented by a physical core that supports hyper-threading, in which more than one application thread executes concurrently at the physical core). Thus, for example, even though the processor 102 may in some embodiments include only a single physical processing unit (core), it could include two or more processing units 102a presented by that single physical processing unit.

Each processing unit 102a executes processor instructions that are defined by applications, and which instructions are selected from among a predefined processor instruction set architecture. The particular instruction set architecture of each processor 102 varies based on processor manufacturer and processor model. Common instruction set architectures include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other instruction set architectures exist and can be used by the present invention. In general, an "instruction" is the smallest externally-visible (i.e., external to the processor) unit of code that is executable by a processor.

Each processing unit 102a obtains processor instructions from one or more processor cache(s) 102b, and executes the processor instructions based on data in the cache(s) 102b, based on data in registers 102c (i.e., hardware-based storage locations that are defined based on the instruction set architecture of the processors(s) 102), and/or without input data. In general, the cache(s) 102b include a small amount (i.e., small relative to the typical amount of system memory 103) of random-access memory that stores on-processor copies of portions of the system memory 103. For example, when executing application 104c, the cache(s) 102b store a subset of the runtime application code 103a in a code cache section of the cache(s) 102b, and stores other runtime application data 103b (e.g., variables, data structures, etc.) in a data cache section the cache(s) 102b. If the processing unit(s) 102a require data not already stored in the cache(s) 102b, then a "cache miss" occurs, and that data is fetched from the system memory 103 (potentially evicting some other data from the cache(s) 102b).

While much of the operation of the processor(s) 102 is defined in hard-coded logic (i.e., circuitry), some of the operation of the processor(s) 102 could be defined with processor microcode 102d. In general, microcode 102d comprises instructions stored in on-processor memory (e.g., a computer storage media) that are executable by the processor(s) 102 in order to direct operation of the processor(s) 102. In some processors, the microcode 102d may be reprogrammable such that the microcode 102d can be reprogrammed subsequent to manufacture. In addition, the processor(s) 102 may include other hardware that may be usable by one or more implementations of cache-based trace replay breakpoints using reserved (or otherwise unused) tag field bits. This other hardware, including buffer(s) 102 and translation lookaside buffer (TLB) 102f is discussed later in connection with description of those implementations.

In accordance with embodiments herein, the debugger 104a makes use of a cache in order to detect when a memory access encounters a defined breakpoint. If implemented in software, this cache could be an in-memory cache, such as a cache stored in system memory 103. If implemented in software, this cache could be a hardware cache, such as one or more of cache(s) 102b. In order to illustrate these concepts, as a preliminary matter FIG. 2 illustrates an example 200 of operation of a cache 201 according to one or more embodiments.

Figure 2:
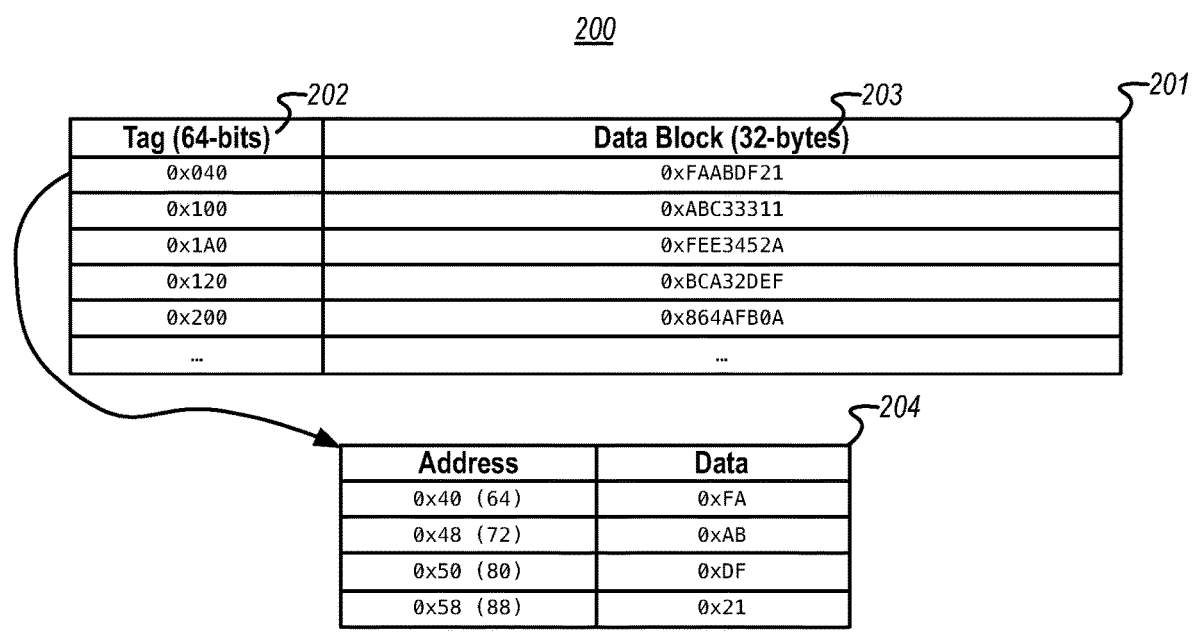
FIG. 2 illustrates an example of operation of a cache.

In particular, FIG. 2 represents cache 201 as a plurality of cache lines (i.e., the depicted rows) that each includes a plurality of fields (i.e., the depicted columns). As indicated by the ellipses, a cache 201 can store great number of cache lines, and is not limited to the five shown. As shown, each cache line can include at least a tag 202 and a data block 203 (though additional columns could be possible). As used in this description and in the claims, the tag 202 can include any cache line metadata (including non-address data) that is usable to identify a cache line match for a subject memory address. The particular configuration of cache 201 can vary depending on processor architecture and memory model, though in the depicted example each cache line includes a 64-bit tag 202 and a 32-byte data block 203. In general, the tag 202 stores at least a memory address (e.g., a physical address in system memory 103), while the data block 203 stores a current value for that memory address.

When a cache miss occurs for a particular memory address during execution at processor(s) 102, that memory address (and, optionally, additional metadata) is placed into the tag 202 of a particular cache line in cache 201, and the value stored at that memory address in system memory 103 (or the value stored at that memory address in some other cache) is placed into the data block 203 for that cache line. This value may change during program execution, and the updated value is pushed back to system memory 103 (or some other cache) when the cache line is evicted. In FIG. 2, cache 201 shows five example memory addresses (e.g., 0x040, 0x100, 0x1A0, 0x120, and 0x200) and corresponding memory values.

Notably, a single cache line may "cover" a plurality of memory addresses. To illustrate, in cache 201, each cache line stores 32-bytes of data that starts at the address stored in the tag 202. However, the processor architecture and memory model may permit memory addresses to be specified more granularly than every 32-bytes. For example, suppose for purposes of this example only that the processor architecture and memory model permit memory addresses to be specified at an 8-byte granularity. This means that each cache line in cache 201 actually "covers" four addressable memory addresses (each corresponding to an 8-byte value). In order to illustrate this, FIG. 2 includes a table 204 that breaks down the first cache line of cache 201 into these four segments. As shown in table 204, and presuming a big-endian architecture, this cache line actually "covers" memory address 0x40 (decimal 64) storing the 8-byte value 0xFA, memory address 0x48 (decimal 72) storing the 8-byte value 0xAB, memory address 0x50 (decimal 80) storing the 8-byte value 0xDF, and memory address 0x58 (decimal 88) storing the 8-byte value 0x21.

As briefly mentioned, embodiments herein utilize one or more "reserved" or otherwise unused address bits in the cache line's tag field as flags to indicate if a cache line overlaps with a watched-for memory address. As will be explained in more detail below, these bits may be able to be reserved or unused based on one or both of memory alignment (i.e., resulting in reserved "low" bits) or a processor using fewer bits for memory addressing than are physically available in the cache (i.e., resulting in reserved "high" bits). As will be appreciated in view of the following description a bit can be "reserved" or unused for use as a flag when the bit (a) is unused for uniquely resolving whether an address exists in a cache, and when the bit is (b) available for making determinations after a first cache line check indicates a non-match in the cache and/or available for making determinations if the address exists in the cache.

Initially, FIGS. 3A and 3B illustrate examples of reserved bits due to memory alignment. It will be appreciated that, while many memories are granularly addressable (e.g., such as at 8-byte increments in the simple example above, though actual processors may permit more granular memory accesses), caches may only permit cache line tags to address at a coarser level, such as every 32 or 64-bytes. Thus, a cache is often referred to as being "memory aligned" at 32 or 64-byte boundaries. Such memory alignment can simplify cache and memory bus implementations (i.e., physical hardware layouts) and can increase memory access speeds. A side-effect of memory alignment is that the addresses stored in the tag field of a cache line will always have a certain number of "low" bits that are zero. In some CPU implementations, these always-zero low bits are not actually stored in the tag field. In some CPU implementations, these always-zero low bits are not checked when searching if a memory address exists in a cache line. The exact number of these bits varies based on the number of bytes used for the memory alignment. FIG. 3A illustrates an example 300a of memory addresses using 64-byte memory alignment, while FIG. 3B illustrates an example 300b of memory addresses using 32-byte memory alignment.

In particular, FIG. 3A includes a table 301 that illustrates nine example memory addresses—expressed in hexadecimal, binary, and decimal forms—starting at address zero and progressing to address 512 in 64-byte increments. As shown in bold in the binary representation, when using 64-byte (i.e., $2^6$) memory alignment, the lowest six bits of the address are always zero. FIG. 3B, on the other hand, includes a table 302 that illustrates seventeen example memory addresses—expressed in hexadecimal, binary, and decimal forms—also starting at address zero and progressing to address 512 in 32-byte increments. As shown in bold in the binary representation, when using 32-byte (i.e., $2^5$) memory alignment, the lowest five bits of the address are always zero. In either case, these low bits can be treated as "reserved" by virtue of their always being zero due to memory alignment.

As was mentioned, a given processor may use fewer bits for memory addressing than the processor architecture theoretically supports. For example, even though a CPU architecture may support 64-bit addressing and pointer (and even use such with virtual memory addresses), the CPU may utilize fewer than 64-bits for memory addresses in the cache. As an example, if there are 64 bits physically available in each tag of a cache, a contemporary INTEL CPU may actually only utilize 48 or 56 of those bits for memory addresses, resulting in the high 16 or 8 bits (respectively) being unused by the processor for addressing. As another example, for a CPU that supports a maximum of 128 GB (i.e., $2^{37}$) of physical memory and has a 64-byte (i.e., $2^6$) aligned cache based on physical memory addresses, then the cache tag would need at least 31 bits (i.e., 37−6) to uniquely identify each possible cache line starting physical memory address.

In general, the number of bits used for the cache tag is a design decision made to simplify processor implementation. Depending on cache implementation, any additional high-order bits actually allocated for the cache tag but not required by the cache implementation design for uniquely identifying the memory address could be always treated as being zero, or they could be ignored entirely. Regardless of their number, these high bits can also be treated being as "reserved" by virtue of the actual memory addressing characteristics of the processor.

Figure 3C:
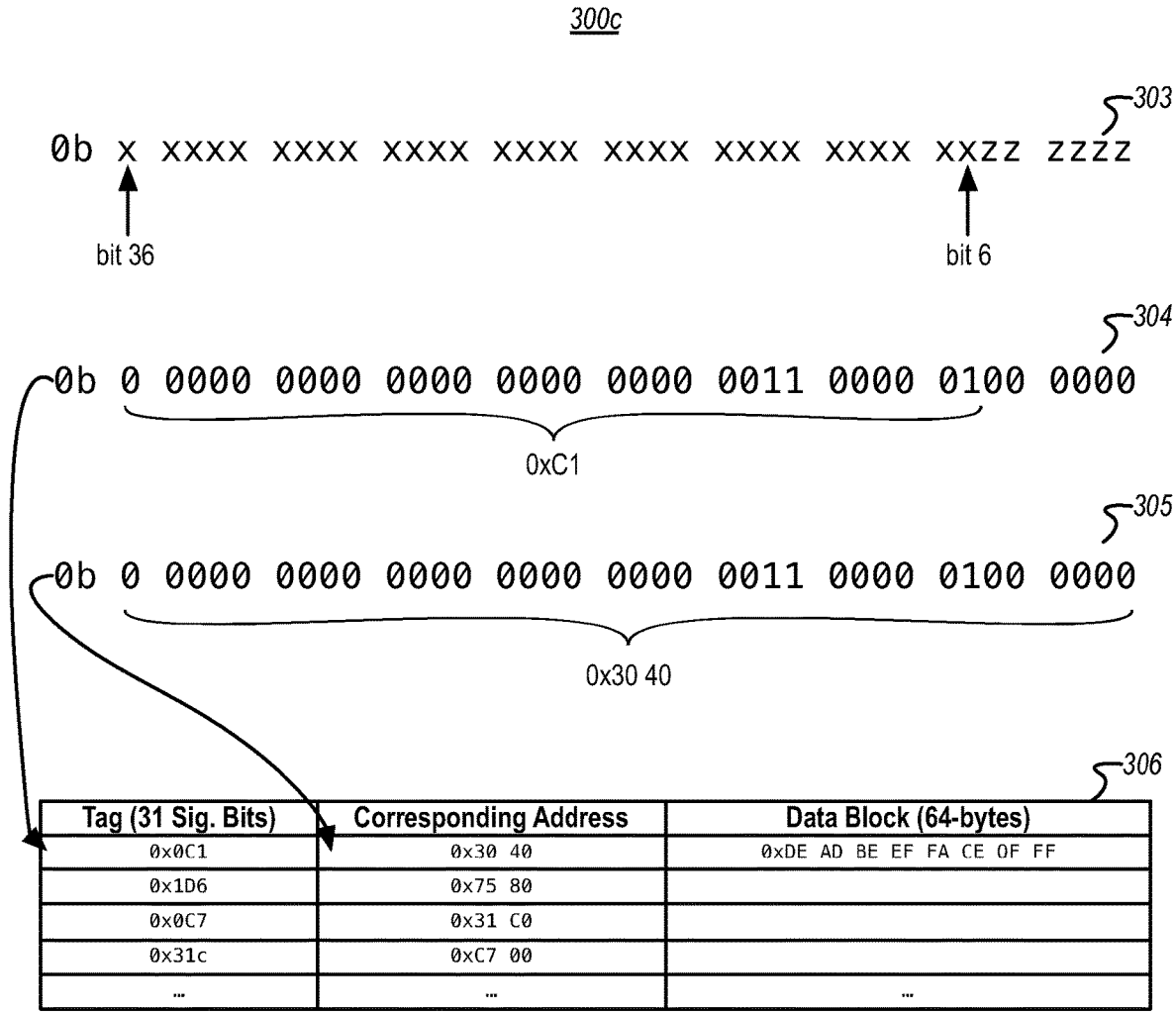
FIG. 3C illustrates an example of use of fewer tag bits than are needed to represent an actual memory address, based on omitting bits that are always zero due to memory alignment.

FIG. 3C illustrates an example 300c of use of fewer tag bits than are needed to represent an actual memory address, based on omitting bits that are always zero due to memory alignment. In particular, FIG. 3C shows possible tag bits used in a CPU that supports a maximum of 128 GB physical memory, and that uses 64-byte data blocks in its cache lines. As demonstrated in the discussion above, 37 bits are needed to uniquely identify each address in 128 GB of memory, and the bottom six bits of these 37 bits are guaranteed to be zero when representing 64-byte aligned memory addresses. In FIG. 3C, this is represented by address 303 which shows that, when the most-significant bit is counted as bit 36 and the least-significant bit is counted as bit 0, the 31 bits from bit 36 to bit 6 (indicated as x's) are the "significant" bits in a cache line address while the six bits from bits 5 to bit 0 (indicated as z's) are guaranteed to be zero in the cache line address. As such, cache implementations may choose to not include those bottom six bits (i.e., bits 5 to 0) at all.

In FIG. 3C, addresses 304 and 305 each show the same binary representation of a cache line address. As shown at address 304, when considering only the 31 "significant" bits of this cache line address, these bits can be represented in hexadecimal as 0xC1. As shown at address 305, however, when considering all the bits of this cache line address, the address is represented in hexadecimal as 0x30 40. Table 306 shows, in its first line, that a cache line's tag may only store these 31 "significant" bits (i.e., 0xC1), rather than the entire 37 bits (i.e., 0x30 40) of the cache line address. Table 306 also shows some other hexadecimal representations of cache line addresses, along with their corresponding "significant bits."

Figure 4:
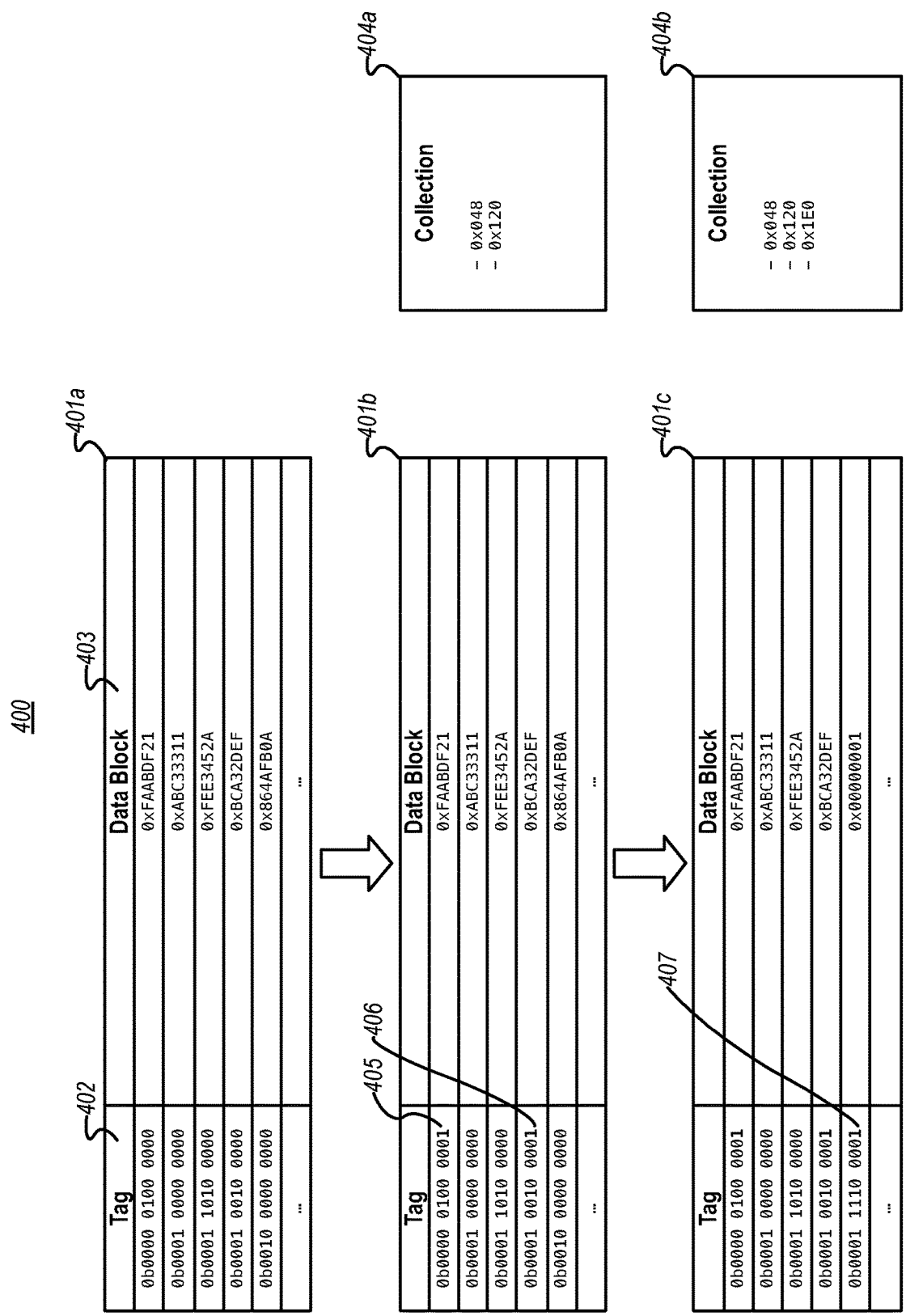
FIG. 4 illustrates an example of operation of cache-based breakpoints using reserved tag field bits.

In the context of the cache 301 of FIG. 3 and the address bit reservations just described, FIG. 4 illustrates an example 400 of operation of cache-based breakpoints using reserved tag field bits. Initially, example 400 includes an example cache 401a, which corresponds to cache 201 of FIG. 2. Notably, each value shown in cache 401a is identical to the value shown in cache 201, except that the values in the tag 402 of cache 401a are expressed in binary, whereas the values in the tag 202 of cache 201 were expressed in hexadecimal. FIG. 4 again presumes a big-endian architecture.

Example 400 also includes a cache 401b, which represents the state of cache 401a at a later time, after two breakpoints have been added to a collection 404a comprising addresses having breakpoints. As shown in collection 404a, these breakpoints include addresses 0x048 and 0x120, both of which correspond to data already in the cache 401b. For example, as was discussed in connection with FIG. 2, address 0x048 is covered by the first cache line, which stores 32-bytes starting at address 0x040, and address 0x120 is covered by the fourth cache line. Due to the addition of these breakpoints, in cache 401b a reserved lower bit 405 in the first cache line has been set to a 1. This bit serves as a flag to indicate that the cache line covers a memory address having a breakpoint. Similarly, in cache 401b a reserved lower bit 406 in the fourth cache line has been set to a 1 since its address (0x120) is also in collection 404a. While the lowest bit in each address has been used as a flag in this example, it will be appreciated that implementations could use any reserved bit as a flag.

Figure 5:
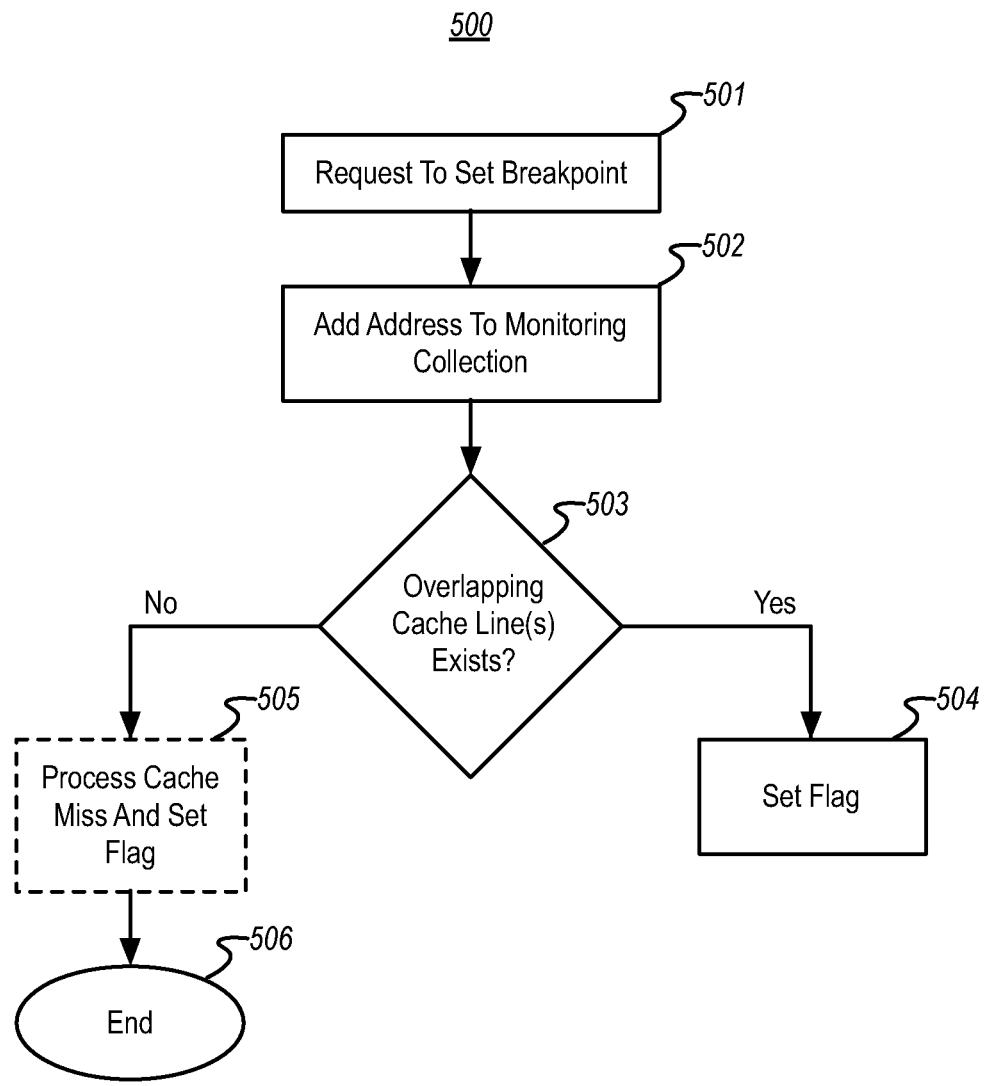
FIG. 5 illustrates a flow chart of an example method for configuring a cache for breakpoint detection.

FIG. 5 illustrates a flowchart 500 of a method 500 for configuring a cache for breakpoint detection, which method could, for example, be used to set flag bits 405 and 406 in cache 401b. Method 500 could be performed, for example, by debugger 104a (e.g., in a software implementation), or could be performed by processor(s) 102 (e.g., in a hardware implementation).

Method 500 begins at act 501, where there is a request to set a breakpoint. Act 501 could comprise identifying a memory address that is to be monitored. For example, based on user input at debugger 104a, an address corresponding to a code element could be identified for setting a breakpoint, or an address corresponding to a data element could be identified for setting a watchpoint. In the context of FIG. 4, for example, address 0x048 or 0x120 could be identified as a memory address to be monitored.

Method 500 proceeds to act 502, where the identified address is added to a monitoring collection (i.e., a collection of monitored addresses). For example, address 0x048 and/or 0x120 could be added to collection 404a.

Method 500 then proceeds to act 503, where it is determined if overlapping cache line(s) exist for the identified address. Stated differently, act 503 could comprise, based at least on identifying the memory address to be monitored, determining whether a cache line overlapping with the memory address already exists in a cache. As discussed above, such cache lines do exist for addresses 0x048 and 0x120. As such, when method 500 is performed for each of these addresses, method 500 would proceed to act 504 where the flag bits for these cache lines are set in the tag field of each cache line (i.e., as reflected in cache 401*b*). If no existing cache line were to exist, then method 500 could end at 506, without setting any flag bits (as shown). However, as shown in act 505, it could optionally process a cache miss on the identified address and set a flag in the tag of the newly imported cache line.

For example, suppose that there is a request to add a new address 0x1E0 as a breakpoint. When performing method 500 on address 0x1E0, the address would be added to the collection in act 502 (i.e., as shown in collection 404*b*). Then, in act 503 it would be determined that no overlapping cache line exists for address 0x1E0. Method 500 could simply end at 506, or method 500 could perform a cache miss on address 0x1E0 and set the flag on the imported cache line in act 505. Performance of act 505 is reflected in cache 401*c*, where the fifth cache line (corresponding to address 0x200) has been evicted and replaced with a new cache line corresponding to address 0x1E0, with flag 407 set in the cache line's tag.

When method 500 sets flag bits in the tag fields cache lines, these flag bits could be reserved based on the tag field containing more bits than are needed to address a full address space accessible by the one or more processors, and/or could be reserved based on memory alignment.

Figure 6:
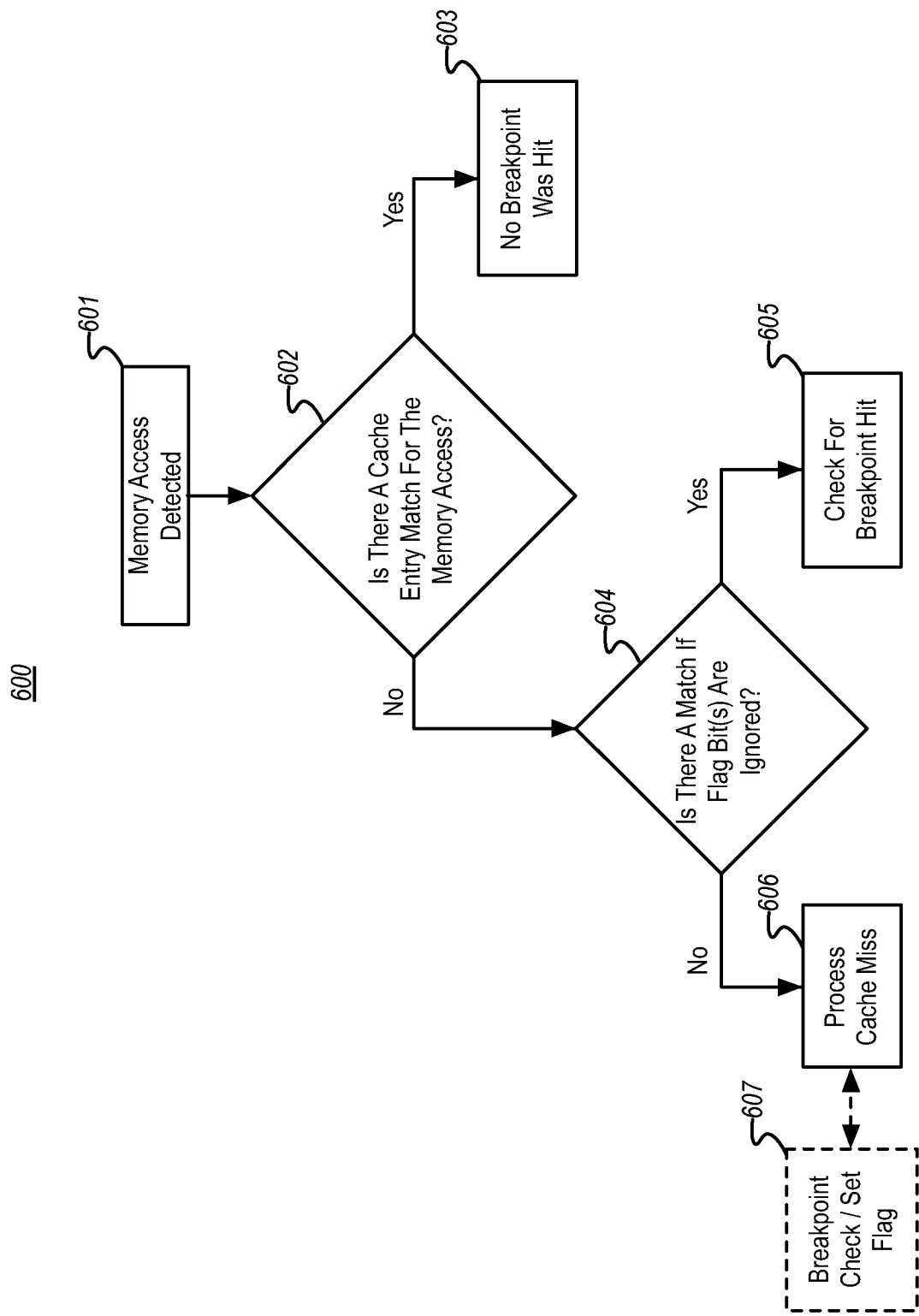
FIG. 6 illustrates a flow chart of an example method for performing breakpoint detection via a cache.

In the context of caches 401*b* and 401*c*, which are now configured with breakpoint flags, and in the context of collections 404*a* and 404*b*, FIG. 6 illustrates a flow chart of an example method 600 for performing breakpoint detection via a cache. Method 600 could be performed, for example, by debugger 104*a* (e.g., in a software implementation), or could be performed by processor(s) 102 (e.g., in a hardware implementation).

Method 600 begins at act 601, where an occurrence of a memory access is detected. This could be any memory access operation to a specified memory address but could more specifically be a read or a write operation to the memory address. After the memory access is detected, method 600 proceeds to act 602, which determines whether there is a cache entry match for the memory access. Stated differently, act 602 could comprise, based at least on detecting the occurrence of the memory access, identifying whether any cache line of the cache matches an address associated with the memory access.

For example, suppose that the memory access is to address 0x100, which corresponds to the second line of caches 401*b*/401*c*. Here, the tag of this second cache line (i.e. 0b0001 0000 0000, or 0x100) would match the memory access address (i.e., 0x100). Since there is a match, method 600 proceeds to act 603, where it is determined that no breakpoint was hit. In other words, act 603 could comprise, when a cache line does match the address of the memory access, determining that no breakpoint was encountered.

In a second example, suppose instead that the memory access is to address 0x120, which, as discussed, is stored in the fourth line of caches 401*b*/401*c*. However, even though address 0x120 is indeed cached within caches 401*b*/401*c*, the requested memory address would not match any tag of caches 401*b*/401*c*. This is because setting of the flag bit in the second cache line changed the value of that cache line's tag to 0x121, rather than 0x120.

Since, in this second example, there is no match for address 0x120, method 600 proceeds to act 604, where it is determined if there is a match if the flag bit(s) are ignored. Stated differently, act 604 can comprise, when no cache line matches the address of the memory access, identifying whether any cache line matches the address associated with the memory access when one or more flag bits are ignored.

For example, the flag bits in each tag of caches 401*b*/401*c* might be assumed to be zero or might be otherwise masked, and the check for a match can be repeated. In this case, the second cache line's tag would be now be presumed to be 0x120 when the flag bit(s) are ignored, which now matches the address associated with the memory access.

Since there is now a match, method 600 proceeds to act 605, which checks for a breakpoint hit. Stated differently, act 605 can comprise, when a cache line does match the address of the memory access when the one or more flag bits are ignored, performing a check for whether a breakpoint was encountered. Here, checking for a breakpoint hit can include comparing the accessed memory address (including any covered memory address) with the addresses listed in collection 404*a*/404*b*. Thus, method 600 could include determining if any address from a monitoring collection overlaps with a plurality of memory addresses covered by the cache line. Since address 0x120 is indeed in collection 404*a*/404*b* a breakpoint was hit.

In a third example, suppose that the memory access is to address 0x048. The data at this address does exist in the first line of caches 401*b*/401*c*, which has address 0x040 in the tag (e.g., as was discussed in connection with table 204 of FIG. 2). Due to the 32-byte memory alignment of caches 401*b*/401*c*, in this second example act 602 would use address 0x040 as the address that is "associated with" the memory access, even though the original address being accessed was 0x048. Similar to the second example, even though address 0x040 is indeed cached within cache 401*b*, the requested memory address would not match any tag of caches 401*b*/401*c*. This is because setting of the flag bit in the first cache line changed the value of that cache line's tag to 0x041, rather than 0x040.

Since in this third example there is no match for address 0x040, method 600 proceeds to act 604, where it is determined if there is a match if the flag bit(s) are ignored. In this case, the second cache line's tag would be now be presumed to be 0x040 when the flag bit(s) are ignored, which now matches the address associated with the memory access. Since there is now a match in act 604, method 600 proceeds to act 605, which checks for a breakpoint hit. Again, checking for a breakpoint hit can include comparing the accessed memory address (including any covered memory address) with the addresses listed in collection 404*a*/404*b*. While address 0x040 is not in collection 404*a*/404*b*, the covered address 0x048 is. Since 0x048 was the originally accessed address, a breakpoint was hit.

In a fourth example, suppose that the memory access is to address 0x1E0 and that method 600 is performed against cache 401*b* and collection 404*b* (i.e., in a situation in which method 500 ended at 506 without performing act 505). Here, method 600 would make it to act 604, where there would be no match, even if the flag bit(s) are ignored. As such, method 600 would proceed to processes a cache miss at act 606 (i.e., importing a cache line into the cache). Stated differently, act 606 can comprise, when no cache line matches the address associated with the memory access when the one or more flag bits are ignored, processing a cache miss.

In connection with processing the cache miss, method 600 might perform an act 607 that includes performing a "breakpoint cache line check" (e.g., determining whether a cache line imported into the cache based on processing the cache miss overlaps with any address from a monitoring collection) and/or setting at a flag on the newly-imported cache line. The result of act 607 could be cache 401*c*, in which the fifth cache line corresponds to 0x1E0 and has the flag 407 set. In performing a breakpoint cache line check, act 607 could compare the accessed memory address (including any covered memory address) with the addresses listed in collection 404b to identify that a breakpoint cache line was encountered. When performing a breakpoint cache line check, act 607 determines what addresses are in the monitoring collection. Implementations might always check the entire address collection, or might include hardware and/or software optimizations that avoid checking addresses in the collection if corresponding cache lines are already in the cache. For example, software might implement such an optimization using two collections (e.g., one with the full monitoring list, and another with only those addresses not in the cache), or hardware might implement such an optimization using flags in the collection (e.g., a flag for each address, which is used to indicate if the address is in the cache or not).

In view of this fourth example, it will be appreciated that breakpoints can be detected by method 600, even if act 505 is omitted in method 500, and even if a cache line covering an address in a breakpoint collection has been evicted after its flag has been set. Accordingly, implementations may choose to omit act 505 in method 500 in order to avoid processing potentially unnecessary cache misses.

Notably, while only a single flag bit has been used in the foregoing examples (i.e., to signal whether a cache line overlaps with an address that is in a monitored collection of addresses), some implementations may use multiple flag bits to provide additional functionality. For example, one or more reserved bits could be used to specify a type of memory access operation that would trigger a breakpoint hit. Thus, for example, additional reserved bits could be used to signal whether the breakpoint corresponding to a cache line should be a break on write, a break on read, a break on access, etc. Then, any of the foregoing acts that perform a breakpoint cache line check (i.e., acts 605 and 607) could also use these additional reserved bits to determine if the memory access type should trigger a breakpoint hit. Additionally, any of the foregoing acts that set a flag (e.g., acts 504 and 607) could comprise setting one or more flags in the tag field of the cache line that indicate a breakpoint type, and in which the breakpoint type could comprises a break on write, a break on read, or a break on access.

In some implementations, a decision as to which bits in each tag that can be used as reserved bits is made at system boot time, based on physical hardware characteristics of the computer system 101. For example, if using low bits based on memory alignment, the number of bits that can be reserved may be identified based on a physical characteristics of cache(s) 102b (e.g., whether they use 32-byte or 64-byte memory address alignment). In another embodiment, if using high bits based on a number of address bits that are actually used for addressing, embodiments may determine an amount of physical system memory 103 that is installed. Since the processor(s) 102 cannot physically address more memory than is installed, but is designed to support at least that CPU's maximum amount of memory at the cache layer, a number of high bits may be reserved based on a number of bits that would be necessary to address the installed physical memory. This could result in more high bits being available than simply relying on the number of address bits that are utilized by default by the processor (e.g., 48 or 56, as discussed above) for physical memory addressing. Thus, it will be appreciated that in methods 500 and 600 the flag bits could be reserved at boot time based on an amount of available physical memory. Note that reserved bits need not only be used for purposes of breakpoint detection. Rather, they might be used, for instance, as part of cache-based tracing mechanisms used by the debugger 104a. On some CPUs, at least one of the following conditions may be true (a) the always-zero low bits are not stored in the cache tag, (b) the always-zero low bits are not available for cache entry match comparison purposes, (c) the address bits not utilized by default by the processor for physical memory addressing are not stored in the cache tag, and (d) the address bits not utilized by default by the processor for physical memory addressing are not available for cache entry match comparison purposes. Even on a CPU where all four of the above conditions are true, where the CPU is configured to use memory less than a threshold (e.g., less than ½ or ¼ the maximum physical memory the CPU was designed to address), at least one bit available for cache entry match comparison purposes and stored in the tag becomes available for use as the flag. This threshold may be detected due to an amount of memory installed for the CPU, by a BIOS limiting the exposed memory to the CPU to less than the amount installed, or by an instruction provided to the CPU indicating a maximum memory to use (even if more memory is otherwise available to the CPU).

Reference throughout has been made to collections of watched memory addresses (e.g., collections 404a and 404b). While in software implementations a collection could be stored in various data structures in system memory 103, hardware implementations may benefit from collections stored on the processor(s) 102 themselves, or that are exposed through existing memory access mechanisms. For example, some processors implement cache coherency protocols (CCPs) that use a directory. In these processors, such collections might be stored in the CCP's directory. Alternatively, some processor implementations might include on-processor buffers (e.g., buffer(s) 102e) that could be used to store these collections. For example, some hardware-based tracing mechanisms might include on-processor buffers that can temporarily store trace data prior to it being written to trace file(s) 104d. Some implementations could also use such buffers to store these address collections. In some implementations, a portion of the cache(s) 102b could even be used for such buffers. In view of the foregoing, it will be appreciated that in methods 500 and 600, the collection of monitored addresses could be stored in an on-processor memory, such as a CCP directory or any other on-processor buffer 102e.

Other implementations could utilize TLB 102f of processor(s) 102 to access address collection data. As will be appreciated by those of ordinary skill in the art, a TLB is generally part of a processor's memory management unit, and it generally stores recent translations between virtual memory addresses (e.g., as seen from processes executing at the processor(s) 102) to physical memory addresses in system memory 103 (e.g., which are actually used by the processor(s) 102, including by the cache(s) 102b). When processor(s) 102 access a physical memory address that lacks a TLB entry, a page table miss occurs, which causes one or more page tables in system memory 103 to be accessed in order to locate the appropriate virtual-to-physical mapping. Implementations might store the address collection in system memory 103 and indicate in each page table entry whether any memory address in the page table is included in the address collection. In this way, page table entries (which are cached in the TLB 102f) can be used to decide whether the address collection might contain a relevant entry for a given memory access. Thus, in method 600, performing the check for whether a breakpoint was encountered could comprise consulting a TLB to determine if a page table corresponding to the memory address contains any monitored memory address. Then, when a page table corresponding to the memory address does contain a monitored memory address, method 600 could include determining if any address from a monitoring collection overlaps with a plurality of memory addresses covered by the cache line.

If multi-level page tables are used, the foregoing data might be stored only in leaves, which would lead to a constant execution time. Alternatively, the foregoing data could be stored only in the higher-level page tables (e.g., indicating that at least one lower-level page table contains an address in the address collection), which could perform more quickly than storing only in leaves, but which could lead more false-positives (i.e., searches of the address collection in situations where the accessed address is not actually in the collection). Thus, act 502 of method 500 could include configuring a page table entry for a page table to indicate that one or more of the page table or a child page table contains a monitored memory address.

Some implementations might interoperate with existing hardware-based breakpoint detection mechanisms, such as a processor's debug registers (e.g., DR0 to DR3 in the INTEL architectures). These implementations provide the benefits of cache-based breakpoint detection (e.g., a virtually unlimited number of breakpoints with low detection overheads), while preserving compatibility with existing software (e.g., software that uses a processor's debug registers). As will be appreciated by those of skill in the art, many processor architectures include fast "compare" hardware that compares a memory address that was accessed by a retiring instruction with the memory address that has been placed in a corresponding debug register. If there is a match, then a breakpoint hit can be signaled to debugging software (e.g., via a register, an interrupt, etc.). Implementations might use this same process to signal when a breakpoint hit has been detected via a cache. For example, once a cache-based breakpoint has been detected, implementations could insert the memory address of the breakpoint into an appropriate register (e.g., DR0 to DR3 in the INTEL architectures), and signal the occurrence of a breakpoint using existing mechanisms (e.g., via a register, an interrupt, etc.). As such, software receives notification of the breakpoint through traditional mechanisms, but it is not limited in the number of breakpoints that can be watched for based on the number of available debug registers. Alternatively, an implementation may trap setting of the corresponding debug register (which may not exist), and implement the debug register functionality entirely via a cache-based breakpoint detection.

Figure 7:
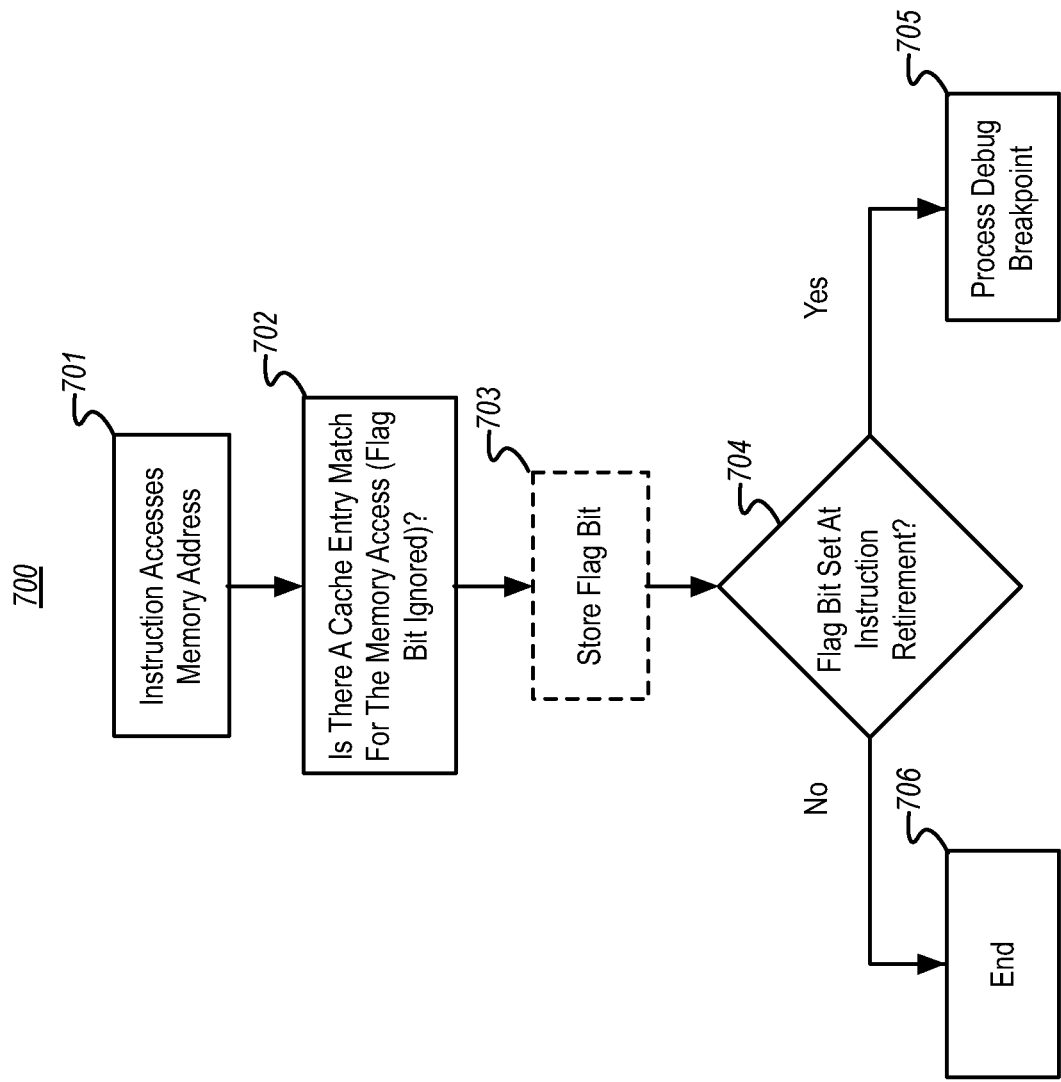
FIG. 7 illustrates a flow chart of an example method for performing breakpoint detection at instruction retire time.

In some implementations, a flag bit is checked at instruction retire time, rather than in response to determining that an address does not have a match in a cache (e.g., act 604 of method 600). For example, FIG. 7 illustrates a flow chart of an example method 700 for performing breakpoint detection at instruction retire time. Method 700 begins at act 701, wherein an instruction accesses a memory address. For example, during execution of application 104*c* at the processor(s) 102 based on trace file(s) 104*d*, a processing unit 102*a* can execute an instruction of application 104*c* that accesses a memory address.

Based on the memory access method 700 proceeds to act 702, which checks if there is a cache entry match for the memory access if the flag bit(s) are ignored. For example, the processor(s) 102 can check the cache(s) 102*b* to determine if there is a cache line match for the memory access, assuming the flag(s) are not set (e.g., assumed to be zero). Although not shown in FIG. 7, the processor(s) 102 could take different actions depending on the result of the check at 702, such as reading a cache line data already in the cache(s) 102*b* (i.e., if there was match) or processing a cache miss to produce an influx of the appropriate cache line data to the cache(s) 102*b* (i.e., if there was not match). Regardless of whether the appropriate cache line data was already in the cache(s) 102*b*, or whether a cache miss was processed, the processor(s) 102 can initiate execution of the instruction based on the cache line data (e.g., by initiating execution of micro-operations corresponding to the instruction).

As shown at act 703, the method 700 might include an act of storing a flag bit. For example, if there was a match in act 702, the processor(s) 102 might store the flag bit (whether it be set or not) from a cache line tag to a register, as part of a micro-operation, or in any other location that is accessible at instruction retire time. If there was no match in act 702, the processor(s) 102 might set flag bit state on a cache line tag as part of processing a cache miss. Then, the processor(s) 102 might store this flag bit (whether it be set or not) from the cache line tag to a register, as part of a micro-operation, or in any other location that is accessible at instruction retire time.

Later, during instruction retire time, act 704 determines if the flag bit was set on the cache line. For example, the processor(s) 102 might access the flag bit on the cache line to determine if it was set, or might access a flag bit from a location to which it was saved in act 703 (if it was performed). Based on the outcome of act 704, method 700 could end at act 706 (i.e., if the flag bit was not set), or it could process a debug breakpoint at act 705 (i.e., if the flag bit was set). Processing a debug breakpoint in act 705 could include setting state of a debug register, as described above.

Notably, as will be appreciated by those of ordinary skill in the art, the cache(s) 102*b* generally comprise multi-level caches having, for example, an L1 layer that is backed by an L2 layer, which may in turn be backed by an L3 layer (and so on). In such multi-level caches, as cache lines move between the layers, the state of the flag bits may move with the cache lines. Thus, for example, if cache 401*b* represents an L1 cache and the first cache line is moved to an L2 cache, the state of flag 405 may remain in set in the instance of the cache line that is in the L2 cache. Alternatively, flag bits might only be used at a subset of cache levels (e.g., only in the L1 level).

Some embodiments may account for additional types of cached data (i.e., beyond cached memory location) that not externally visible. For example, some processors may keep a cache of decoded processor instructions (i.e., their corresponding micro-code). In these situations, when an instruction is decoded the processor may verify that the instruction is still in the code cache (and check the flag bit) in order to detect a breakpoint. Alternatively, a micro-code sequence might be modified to contain the fact that a breakpoint may be hit, avoiding the need to query the cache.

Accordingly, at least some embodiments advance cache-based breakpoint detection in a manner that avoids evicting cache lines overlapping with memory addresses that are being watched, and at least some embodiments advance cache-based breakpoint detection in a manner that avoids cache influx events for cache lines overlapping with memory addresses that are being watched. In particular, rather than evicting a cache line that overlaps with a watched-for memory address, these embodiments utilize one or more "reserved" or currently unused address bits in the cache line's tag field in order to signal that the cache line overlaps with a watched-for memory address. Doing so not only reduces the number of cache misses and/or cache influxes that occur, but also enables efficient breakpoint cache line checks to be performed when there is a subsequent memory access involving the cache line (i.e., as opposed to only during a cache miss). In particular, rather than needing to re-import the cache line (cache influx) on a subsequent memory access due to a cache miss, an efficient breakpoint cache line check can be performed when there is a hit on any cache line that has a reserved bit set in the cache line's tag field. Thus, the embodiments herein avoid cache line evictions for the purposes of breakpoint detection and add a new efficient breakpoint detection mechanism for existing cache lines—both of which can greatly reduce the overhead caused by a debugger for detecting breakpoints during a trace replay.

Operation of these advantages over prior cache-based breakpoint detection solutions can be observed in the context of FIG. 4. For example, referring to caches 401a and 401b and collection 404a, when setting up a break-on-access to the eight-byte value at 0x120 the prior solutions would have evicted the fourth cache line at tag 0x120 from cache 401a. The present embodiments, however, avoid doing so and instead modify the cache line's tag to set flag bit 406, resulting in tag 0x121 in cache 401b.

Next, suppose that an executing code instruction accesses address 0x128. While this address is not in collection 404a, it is "covered" by the cache line addressed 0x120. Because the prior solution would have evicted the fourth line when setting up the breakpoint for address 0x120, this access would result in a cache miss and cache influx, followed by a cache eviction after the instruction retires. The present embodiments, however, retained the cache line when setting up the breakpoint. Thus, while there be an initial address miss due to the setting of flag 406, the cache line would later be discovered with the flag set (i.e., act 604). As such, in the present embodiments the instruction can retire without needing to perform any cache influx.

Finally, suppose that another executing code instruction accesses address 0x120—which is in collection 404a. Again, the prior solution would result in another cache miss and cache influx. The present embodiments, however, would again have an initial address miss due to the setting of flag 406, but the cache line would later be discovered with the flag set (i.e., act 604). As such, in the present embodiments the instruction can again retire without needing to perform any cache influx.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes one or more processors, for performing breakpoint detection via a cache, the method comprising:

detecting an occurrence of a memory access; and
based at least on detecting the occurrence of the memory access, identifying whether any cache line of the cache matches an address associated with the memory access, and
when a cache line does match the address associated with the memory access, determining that no breakpoint was encountered; or
when no cache line matches the address associated with the memory access, identifying whether any cache line matches the address associated with the memory access when one or more flag bits are ignored, and
when a cache line does match the address associated with the memory access when the one or more flag bits are ignored, performing a check for whether a breakpoint was encountered; or
when no cache line matches the address associated with the memory access when the one or more flag bits are ignored,
processing a cache miss; and
determining whether a cache line imported into the cache based on processing the cache miss overlaps with any address from a monitoring collection.

2. The method of claim 1, further comprising, when the cache line imported into the cache overlaps with an address from the monitoring collection, setting a flag bit on the cache line.

3. The method of claim 1, wherein performing the check for whether a breakpoint was encountered comprises determining if any address from a monitoring collection overlaps with a plurality of memory addresses covered by the cache line.

4. The method of claim 3, wherein the monitoring collection is stored in system memory.

5. The method of claim 3, wherein the monitoring collection is stored in a processor memory.

6. The method of claim 5, wherein the processor memory comprises a cache coherence protocol directory.

7. The method of claim 1, wherein performing the check for whether a breakpoint was encountered comprises consulting a translation look aside buffer to determine if a page table corresponding to the memory address contains any monitored memory address.

8. The method of claim 7, further comprising, when the page table corresponding to the memory address does contain a monitored memory address, determining if any address from a monitoring collection overlaps with a plurality of memory addresses covered by the cache line.

9. The method of claim 1, wherein performing the check for whether a breakpoint was encountered compromises placing an address of the cache line into a hardware debug register.

10. A computer system, comprising:
one or more processors; and
one or more hardware storage devices having stored thereon computer-executable instructions that configure the one or more processors to perform breakpoint detection via a cache comprising a plurality of cache lines, including at least:
detecting an occurrence of a memory access at a particular memory address; and
based at least on detecting the occurrence of the memory access, identifying whether any cache line of the cache matches the particular memory address associated with the memory access by comparing a corresponding memory address associated with each of the plurality of cache lines with the particular memory address, and when a cache line does match the particular memory address associated with the memory access, determining that no breakpoint was encountered; or when no cache line matches the particular memory address associated with the memory access, identifying whether any cache line matches the particular memory address associated with the memory access when one or more bits of each corresponding memory address are ignored, and when a cache line does match the particular memory address associated with the memory access when the one or more bits of each corresponding memory address are ignored, performing a check for whether a breakpoint was encountered, wherein the one or more bits indicate whether there is a breakpoint on a memory address overlapping with the cache line; or when no cache line matches the particular memory address associated with the memory access when the one or more bits are of each corresponding memory address ignored, processing a cache miss.

11. The computer system of claim 10, wherein the one or more processors comprise the hardware storage devices and the cache, and wherein the computer-executable instructions comprise processor microcode.

12. A method, implemented at a computer system that includes one or more processors and a system memory, for configuring a cache for breakpoint detection, the method comprising:

identifying a particular memory address in the system memory that is to be monitored; and based at least on identifying the particular memory address in the system memory to be monitored, determining whether a cache line comprising a tag field storing the particular memory address already exists in a cache of the system memory, the cache comprising a plurality of cache lines that each comprises a corresponding tag field storing a corresponding memory address and a corresponding data block storing cached data for the corresponding memory address, and when the cache line comprising the tag field storing the particular memory address already exists in the cache, setting a flag in the tag field of the cache line, wherein setting the flag in the tag field of the cache line comprises modifying at least one bit in the tag field that is used to store the particular memory address within the tag field.

13. The method of claim 12, wherein setting the flag in the tag field of the cache line comprises setting a bit that is reserved based on the tag field containing more bits than are needed to address a full address space accessible by the one or more processors.

14. The method of claim 12, wherein setting the flag in the tag field of the cache line comprises setting a bit that is reserved based on memory alignment.

15. The method of claim 12, wherein setting the flag in the tag field of the cache line comprises setting a bit that is reserved at boot time based on an amount of available physical memory.

16. The method of claim 12, further comprising setting one or more flags in the tag field of the cache line that indicate a breakpoint type.

17. The method of claim 12, the method also comprising adding the memory address to a collection of monitored addresses stored in an on-processor memory.

18. The method of claim 12, the method also comprising adding the memory address to a collection of monitored addresses stored in system memory.

19. The method of claim 12, further comprising configuring a page table entry for a page table to indicate that one or more of the page table or a child page table contains a monitored memory address.

* * * * *